United States Patent
Okuyoshi et al.

(10) Patent No.: US 10,199,666 B2
(45) Date of Patent: Feb. 5, 2019

(54) FUEL CELL SYSTEM

(71) Applicant: TOYOTA JIDOSHA KABUSHIKI KAISHA, Toyota-shi, Aichi-ken (JP)

(72) Inventors: Masahiro Okuyoshi, Okazaki (JP); Hiroyuki Imanishi, Toyota (JP); Kazuo Yamamoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/181,724

(22) Filed: Jun. 14, 2016

(65) Prior Publication Data
US 2016/0380284 A1 Dec. 29, 2016

(30) Foreign Application Priority Data
Jun. 25, 2015 (JP) ................. 2015-127344

(51) Int. Cl.
*H01M 8/04225* (2016.01)
*H01M 8/04089* (2016.01)
(Continued)

(52) U.S. Cl.
CPC ... *H01M 8/04225* (2016.02); *H01M 8/04089* (2013.01); *H01M 8/04302* (2016.02);
(Continued)

(58) Field of Classification Search
None
See application file for complete search history.

(56) References Cited

U.S. PATENT DOCUMENTS

2007/0111058 A1* 5/2007 Yoshida ............ H01M 8/04223
  429/408
2008/0213635 A1* 9/2008 Blaszczyk ......... H01M 8/04097
  429/429
(Continued)

FOREIGN PATENT DOCUMENTS

CN 101341619 A 1/2009
CN 102369623 A 3/2012
(Continued)

*Primary Examiner* — Carmen V Lyles-Irving
(74) *Attorney, Agent, or Firm* — Finnegan, Henderson, Farabow, Garrett & Dunner, LLP (57) ABSTRACT

An object is to reduce the noise and the vibration caused in operation of an injector in a non-power generation state of a fuel cell. There is provided a fuel cell system comprising fuel cells configured such that each fuel cell includes an anode, an electrolyte membrane and a cathode; an injector that is configured to supply hydrogen to the anode; and a controller that is configured to control operation of an injector to make pressure of the anode reach a target pressure. In a non-power generation state that is after a start of the fuel cell system but is before power generation of the fuel cells, the controller sets a second target pressure that is higher than a first target pressure to the target pressure and controls operation of the injector to make the pressure of the anode equal to the second target pressure. After the pressure of the anode is increased to be higher than the first target pressure, the controller sets the first target pressure to the target pressure and controls operation of the injector to make the pressure of the anode equal to the first target pressure. The first target pressure is a pressure required to supply hydrogen over the entire anodes in the fuel cell stack.

6 Claims, 7 Drawing Sheets

(51) Int. Cl.
*H01M 8/0438* (2016.01)
*H01M 8/04664* (2016.01)
*H01M 8/04746* (2016.01)
*H01M 8/04302* (2016.01)

(52) U.S. Cl.
CPC ... *H01M 8/04388* (2013.01); *H01M 8/04664* (2013.01); *H01M 8/04753* (2013.01); H01M 8/04097 (2013.01); H01M 2250/20 (2013.01); Y02T 90/32 (2013.01)

(56) References Cited

U.S. PATENT DOCUMENTS

| | | |
|---|---|---|
| 2009/0029226 A1 | 1/2009 | Yamagishi et al. |
| 2009/0130510 A1 | 5/2009 | Ishikawa et al. |
| 2011/0138883 A1 | 6/2011 | Falta et al. |
| 2012/0013183 A1 | 1/2012 | Yoshida et al. |
| 2014/0209179 A1* | 7/2014 | Maier ............ G01F 1/363 137/12 |
| 2016/0141687 A1 | 5/2016 | Yamamoto et al. |
| 2016/0172696 A1* | 6/2016 | Milacic ............ H01M 8/04992 429/431 |

FOREIGN PATENT DOCUMENTS

| | | |
|---|---|---|
| DE | 11 2006 003 292 T5 | 10/2008 |
| DE | 10 2010 053 626 A1 | 6/2011 |
| DE | 10 2015 117 841 A1 | 5/2016 |
| JP | 2007-165019 A | 6/2007 |
| JP | 2007-194189 A | 8/2007 |
| JP | 2008-130442 | 6/2008 |
| JP | 2010-238544 A | 10/2010 |
| JP | 2013-246984 | 12/2013 |
| KR | 10-2008-0068755 A | 7/2008 |

* cited by examiner

Fig.6

FUEL CELL SYSTEM

CROSS-REFERENCE TO RELATED APPLICATIONS

The present application claims priority from Japanese patent application No. 2015-127344 filed on Jun. 25, 2015, the content of which is hereby incorporated by reference into this application.

BACKGROUND

Field

The present invention relates to a fuel cell system.

Related Art

As an example of a fuel cell system that controls the supply of a reactive gas to a fuel cell, a system disclosed in JP 2008-130442A computes a target pressure value of a fuel gas based on the operating state of a fuel cell stack and controls operation of the injector to regulate the supply amount of the fuel gas, in order to compensate for a difference between the calculated target pressure value and a pressure value detected by a sensor.

In such a fuel cell system using the injector to regulate the supply amount of the fuel gas, in a non-power generation state where neither a compressor configured to supply the air used for power generation of the fuel cell nor a cooling water pump configured to circulate cooling water for the fuel cell starts operating after a start of the system, operation of the injector, especially frequent operation of the injector, is likely to make the user feel uncomfortable because of the lack of operation noise of the compressor and the cooling water pump, compared with the operation of the injector in the power generation state. There is accordingly a need for a technique that reduces the noise and the vibration caused by operation of the injector in the non-power generation state of the fuel cell.

SUMMARY

In order to solve at least part of the above problems, the invention may be implemented by any of the following aspects.

(1) According to one aspect of the invention, there is provided a fuel cell system. The fuel cell system comprises a fuel cell stack that has a plurality of fuel cells, wherein each fuel cell includes an electrolyte membrane, an anode formed on one surface of the electrolyte membrane and a cathode formed on the other surface of the electrolyte membrane; an injector that is configured to supply hydrogen to the anode; and a controller that is configured to control operation of the injection to make a pressure of the anode reach a target pressure. In a non-power generation state that is after a start of the fuel cell system but is before power generation of the fuel cells, the controller sets a second target pressure that is higher than a first target pressure to the target pressure and controls operation of the injector to make the pressure of the anode equal to the second target pressure. After the pressure of the anode is increased to be higher than the first target pressure, the controller sets the first target pressure to the target pressure and controls operation of the injector to make the pressure of the anode equal to the first target pressure. The first target pressure is a pressure required to supply hydrogen over the entire anodes in the fuel cell stack. The fuel cell system of this aspect sets the second target pressure that is higher than the first target pressure to the target pressure of the anode, and controls operation of the injector to make the pressure of the anode equal to the second target pressure. After the pressure of the anode is increased to be higher than the first target pressure, the fuel cell system sets the first target pressure to the target pressure of the anode. This reduces the frequency when the pressure of the anode becomes lower than the first target pressure. This results in reducing the number of times or frequency of operation of the injector for the purpose of making the pressure of the anode equal to the first target pressure. This accordingly reduces the noise and the vibration caused by operation of the injection in the non-power generation state.

(2) The fuel cell system of the above aspect may further comprise a circulation passage that is arranged to return an off gas discharged from the anode, to the anode; and a pump that is provided on the circulation passage. The controller may operate the pump to return the off gas discharged from the anode, to the anode in the non-power generation state. The fuel cell system of this aspect makes it, easier to supply hydrogen over the entire anode in the fuel cell and thus more effectively suppresses hydrogen deficiency in the anode.

(3) In the fuel cell system of the above aspect, in the non-power generation state, after making the pressure of the anode equal to the second target pressure, the controller may measure the pressure of the anode to perform a hydrogen leakage test in the fuel cell system. The fuel cell system of this aspect reduces the noise and the vibration caused by operation of the injector in the configuration that performs the hydrogen leakage test.

The invention may be implemented by various aspects other than the fuel cell system described above, for example, a control method of the fuel cell system or a vehicle with the fuel cell system mounted thereon.

DESCRIPTION OF EMBODIMENTS

A. First Embodiment

A1. System Configuration

Figure 1:
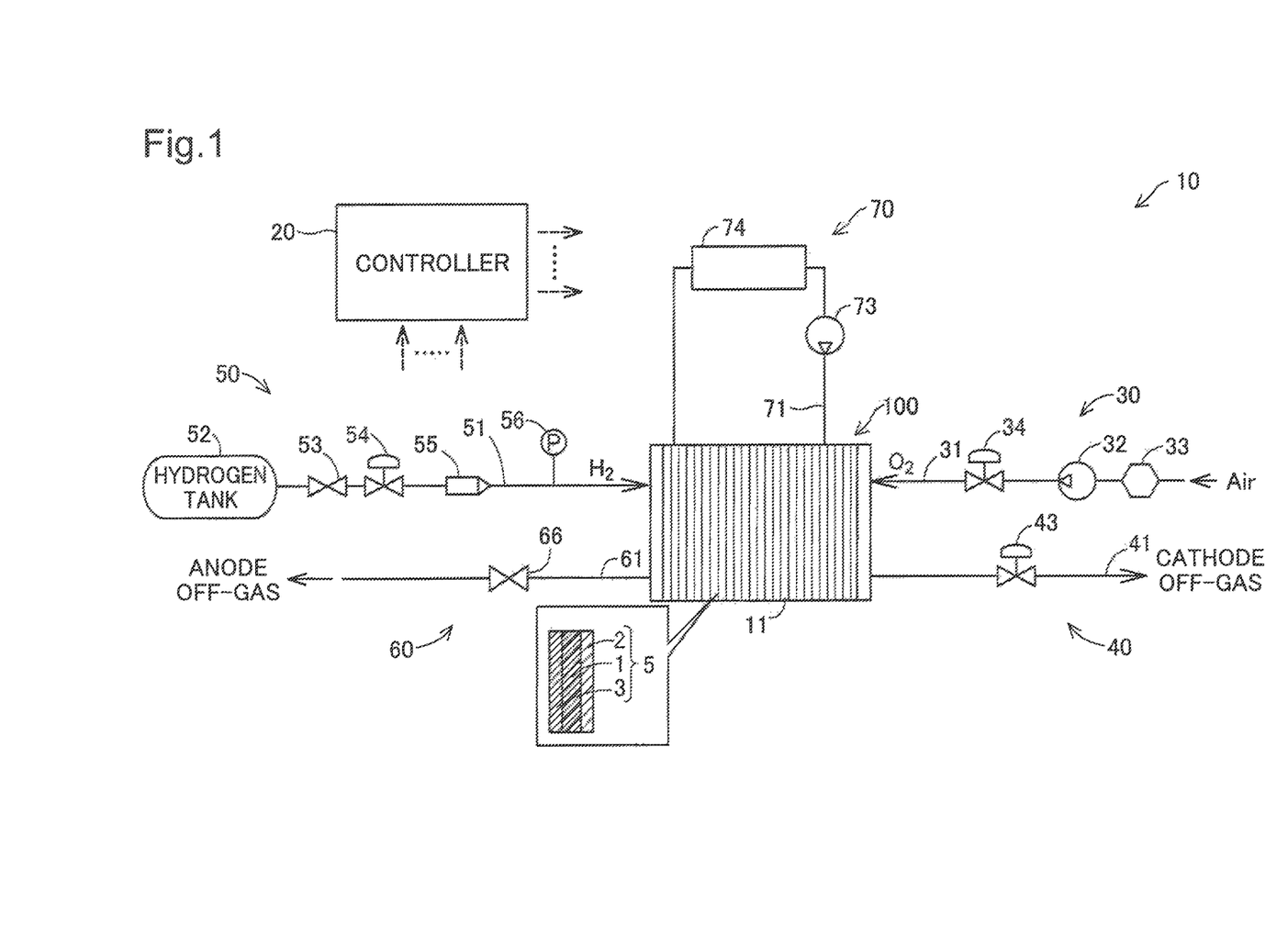
FIG. 1 is a diagram illustrating the schematic configuration of a fuel cell system according to a first embodiment of the invention.

FIG. 1 is a diagram illustrating the schematic configuration of a fuel cell system 10 according to a first embodiment of the invention. The fuel cell system 10 is mounted on, for example, a vehicle to output electric power as the power source of the vehicle in response to the driver's request. The fuel cell system 10 of the embodiment includes a fuel cell stack 100, a controller 20, a cathode gas supply system 30, a cathode gas discharge system 40, an anode gas supply system 50, an anode gas discharge system 60 and a cooling system 70.

The fuel cell stack 100 is implemented by polymer electrolyte fuel cells that receive supplies of hydrogen (anode gas) and the air (cathode gas) as reactive gases and generate electric power. The fuel cell stack 100 is constituted by stacking a plurality of fuel cells 11.

Each fuel cell 11 includes a membrane electrode assembly 5, and two separators (not shown) that are plate base members arranged across the membrane electrode assembly 5 to form flow paths for reactive gases and a cooling medium and also serve as current collectors. The membrane electrode assembly 5 includes an electrolyte membrane 1 and electrodes 2 and 3 placed on the respective surfaces of the electrolyte membrane 1. The electrolyte membrane 1 is a polymer electrolyte thin film having good proton conductivity in the wet state. The electrode of the fuel cell 11 to which the air is supplied is called cathode (air electrode), and the electrode to which hydrogen is supplied is called anode (fuel electrode). In the process of power generation in the fuel cell 11, water is produced on the cathode side by the electrochemical reaction of hydrogen and oxygen.

The controller 20 is implemented by a computer including a CPU, a RAM and a ROM. The controller 20 performs a hydrogen supply process to supply hydrogen while reducing at least one of the noise and the vibration of an injector 55 in the non-power generation state. A first target pressure P1, a second target pressure P2 and a set time tP2 since setting of the second target pressure P2 that are used in the hydrogen supply process are stored in the ROM of the controller 20. The details of the hydrogen supply process will be described later. The controller 20 sets a target pressure that is a target value of anode pressure in the fuel cell stack 100 and controls the operation of the injector 55 to make the anode pressure equal to the target pressure. More specifically, the controller 20 sets the second target pressure P2 that is higher than the first target pressure P1 to the target pressure of the anode and controls the operation of the injector 55 to make the anode pressure equal to the second target pressure P2. After the anode pressure is increased to be higher than the first target pressure P1, the controller 20 sets the first target pressure P1 to the target pressure of the anode and controls the operation of the injector 55 to make the anode pressure equal to the first target pressure P1. Additionally, the controller 20 controls the cathode gas supply system 30, the cathode gas discharge system 40, the anode gas supply system 50, the anode gas discharge system 60 and the cooling system 70 and causes the fuel cell stack 100 to generate electric power.

The cathode gas supply system 30 includes a cathode gas pipe 31, an air compressor 32, an air flowmeter 33 and an on-off valve 34. The cathode gas pipe 31 is a piping connected with a supply manifold on the cathode side of the fuel cell stack 100. The air compressor 32 is connected with the fuel cell stack 100 via the cathode gas pipe 31 to take in and compress the outside air and supply the compressed intake air as the cathode gas to the fuel cell stack 100.

The air flowmeter 33 is placed upstream of the air compressor 32 and serves to measure the amount of the outside air taken in by the air compressor 32 and send the measured value to the controller 20. The controller 20 operates the air compressor 32 based on this measured value to control the supply amount of the air to the fuel cell stack 100. The on-off valve 34 is provided between the air compressor 32 and the fuel cell stack 100. The on-off valve 34 is normally closed and is opened by supply of the air having a predetermined pressure from the air compressor 32 to the cathode gas pipe 31.

The cathode gas discharge system 40 includes a cathode off-gas pipe 41 and a pressure regulator 43. The cathode off-gas pipe 41 is a piping connected with a discharge manifold on the cathode side of the fuel cell stack 100. A cathode off-gas is flowed through the cathode off-gas pipe 41 and is discharged out of the fuel cell system 10. The pressure regulator 43 has its opening controlled by the controller 20, so as to regulate the pressure of the cathode off-gas in the cathode off-gas pipe 41 (i.e., the back pressure on the cathode side of the fuel cell stack 100).

The anode gas supply system 50 includes an anode gas pipe 51, a hydrogen tank 52, an on-off valve 53, a regulator 54, an injector 55 and a pressure measurement unit 56. The hydrogen tank 52 is connected via the anode gas pipe 51 with a supply manifold on the anode side of the fuel cell stack 100 to supply hydrogen stored in the hydrogen tank 52 to the fuel cell stack 100.

The on-off valve 53, the regulator 54, the injector 55 and the pressure measurement unit 56 are disposed in this sequence from the hydrogen tank 52-side that is the upstream side. The on-off valve 53 is opened and closed in response to a command from the controller 20 to control the inflow of hydrogen from the hydrogen tank 52 to the upstream side of the injector 55. The regulator 54 is a pressure reducing valve to regulate the pressure of hydrogen on the upstream side of the injector 55 and has its opening controlled by the controller 20. The injector 55 is a solenoid-operated on-off valve. The pressure measurement unit 56 measures the pressure on the downstream side of the injector 55 and sends the measured value to the controller 20. According to this embodiment, the controller 20 obtains the pressure on the downstream side of the injector 55 as the anode pressure in the fuel cell stack 100.

The anode gas discharge system 60 includes an anode off-gas pipe 61 and an on-off valve 66. The anode off-gas pipe 61 is a piping connected with a discharge manifold on the anode side of the fuel cell stack 100. An anode off-gas including unreacted gases (for example, hydrogen and nitrogen) that are not consumed by power generation of the fuel cell stack 100 is flowed through the anode off-gas pipe 61 and is discharged out of the fuel cell system 10. The on-off valve 66 is provided on the anode off-gas pipe 61 and is opened and closed in response to a command from the controller 20.

The cooling system 70 includes a cooling pipe 71, a cooling water pump 73 and a radiator 74. Cooling water is flowed through the cooling pipe 71 and is circulated in the fuel cell stack 100 by the cooling water pump 73 to cool down the fuel cell stack 100, is subsequently cooled down by the radiator 74, and is again supplied to the fuel cell stack 100.

The fuel cell system 10 mounted on the vehicle additionally includes a secondary battery and a DC-DC converter configured to control the output voltage of the fuel cell stack 100 and to control charging and discharging of the secondary battery, although they are neither specifically illustrated nor described. The secondary battery accumulates the electric power output from the fuel cell stack 100 and the regenerative electric power and serves as the power source, along with the fuel cell stack 100.

A2. Hydrogen Supply Process

The following describes the hydrogen supply process performed in the fuel cell system 10. This process is performed in the non-power generation state that is after a start of the fuel cell system 10 but is before power generation of the fuel cells 11.

The hydrogen supply process supplies in advance hydrogen from the anode gas supply system 50 to the fuel cell stack 100, in order to save the time period until hydrogen is supplied to the entire anodes at the time of power generation of the fuel cell stack 100 after a start of the fuel cell system 10. The vehicle with the fuel cell system 10 mounted thereon is in the "standby state for starting the vehicle". The "standby state for starting the vehicle" means the state that allows the vehicle with the fuel cell system 10 mounted thereon to start, for example, by the user's depression of an accelerator pedal. The "standby state for starting the vehicle" is released by the user's depression of the accelerator pedal, and the fuel cell stack 100 starts power generation.

Figure 2:
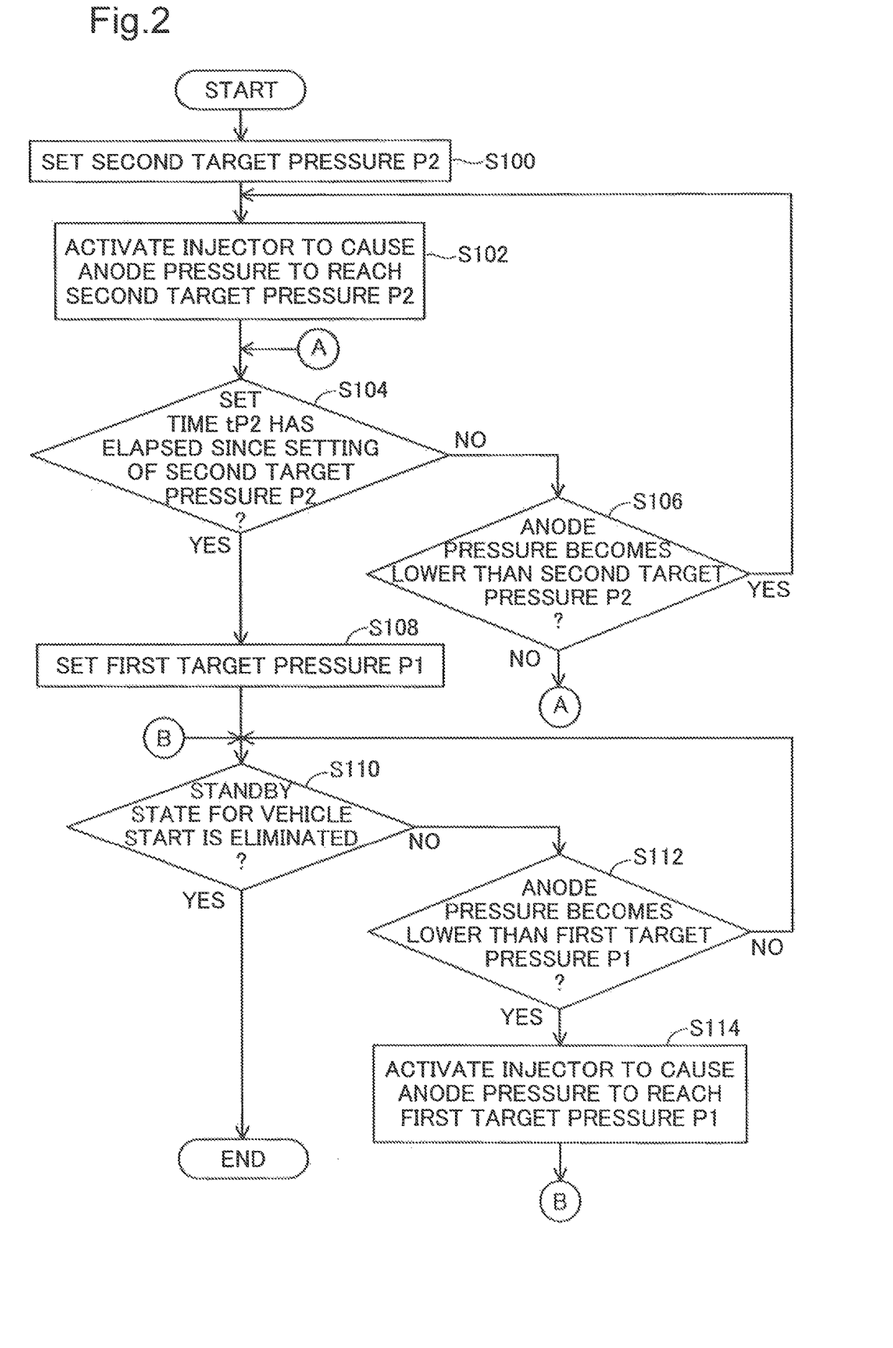
FIG. 2 is a flowchart showing a hydrogen supply process performed by a controller.

FIG. 2 is a flowchart showing the hydrogen supply process performed by the controller 20. On start of the hydrogen supply process, the controller 20 reads the second target pressure P2 stored in advance in the ROM of the controller 20 and sets the second target pressure P2 that is higher than the first target pressure P1 to the target pressure of the anode in the fuel cell stack 100 (step S100). The first target pressure P1 is a pressure determined to cause hydrogen to be supplied over the entire anodes in the fuel cell stack 100. According to this embodiment, the first target pressure P1 is a total pressure of a minimum required pressure to prevent partial deficiency of hydrogen in the anodes of the fuel cell stack 100 and a measurement error of the pressure measurement unit 56. The target second pressure P2 is a pressure set to suppress the anode pressure in, the fuel cell stack 100 from decreasing below the first target pressure P1 until the standby state for starting the vehicle is released. The second target pressure P2 may be determined by, for example, experimentally computing a relationship of the decrease amount of hydrogen by crossover in the fuel cell stack 100 to the ordinary time period until release of the standby state for starting the vehicle and the first target pressure P1 and adding a measurement error of the pressure measurement unit 56 to the computed value.

The controller 20 subsequently controls the operation of the injector 55 to make the anode pressure equal to the second target pressure P2 (step S102). More specifically, the controller 20 calculates a differential pressure between the second target pressure P2 and the anode pressure in the fuel cell stack 100 obtained from the pressure measurement unit 56, operates the injector 55 to open the valve of the injector 55 and supply the anode gas corresponding to the calculated differential pressure in order to make the anode pressure reach the second target pressure P2, and then closes the valve of the injector 55. The processing of step S102 increases the anode pressure to the second target pressure P2 that is higher than the first target pressure P1.

After the anode pressure is increased to be higher than the first target pressure P1 by the processing of step S102, the controller 20 reads the first target pressure P1 stored in advance in the ROM of the controller 20 and sets the first target pressure P1 to the target pressure of the anode in the fuel cell stack 100 (step S108).

According to this embodiment, the controller 20 performs the following series of controls after operating the injector 55 to make the anode pressure reach the second target pressure P2 at step S102 and before setting the first target pressure P1 to the target pressure of the anode at step S108.

After operating the injector 55 to make the anode pressure reach the second target pressure P2 (step S102), the controller 20 determines whether a previously set time tP2 has elapsed since setting of the second target pressure P2 to the target pressure (step S104). Hereinafter this previously set time tP2 is simply referred to as "set time tP2". The set time tP2 may be, for example, several seconds. The set time tP2 may be determined appropriately according to a time period required for starting the other systems of the fuel cell system 10, for example, the cathode gas supply system 30. According to this embodiment, after elapse of the set time tP2, the cathode gas supply system 30 is ready to sufficiently supply the cathode gas to the fuel cell stack 100 and to perform power generation promptly.

When the set time tP2 has not yet elapsed (step S104: NO), the controller 20 obtains the anode pressure in the fuel cell stack 100 from the pressure measurement unit 56 and determines whether the anode pressure becomes lower than the second target pressure P2 (step S106). When the anode pressure becomes lower than the second target pressure P2 (step S106: YES), the controller 20 returns to step S102 to operate the injector 55 to make the anode pressure reach the second target pressure P2 by supplying the anode gas corresponding to the differential pressure between the second target pressure P2 and the anode pressure in the fuel cell stack 100 obtained, from the pressure measurement unit 56.

When the set time tP2 has not yet elapsed (step S104: NO) and the anode pressure does not become lower than the second target pressure P2 (step S106: NO), the controller 20 determines again whether the set time tP2 has elapsed (step S104). When the set time tP2 has elapsed (step S104: YES), on the other hand, the controller 20 sets the first target pressure P1 to the target pressure of the anode (step S108).

After setting the first target pressure P1 (step S108), the controller 20 determines whether the standby state for starting the vehicle is released (step S110). When the standby state for starting the vehicle is not released (step S110: NO), the controller 20 obtains the anode pressure in the fuel cell stack 100 from the pressure measurement unit 56 and determines whether the anode pressure becomes lower than the first target pressure P1 (step S112). When the anode pressure becomes lower than the first target pressure P1 (step S112: YES), the controller 20 operates the injector 55 to make the anode pressure reach the first target pressure P1 by supplying the anode gas corresponding to the differential pressure between the first target pressure P1 and the anode pressure in the fuel cell stack 100 obtained from the pressure measurement unit 56 (step S114).

When the standby state for starting the vehicle is not released, (step S110: NO) and the anode pressure does not become lower than the first target pressure P1 (step S112: NO), the controller 20 returns to step S110 to determine again whether the standby state for starting the vehicle is released.

When the standby state for starting the vehicle is released (step S110: YES), on the other hand, the controller 20 terminates the hydrogen supply process and changes the target pressure to a pressure required for power generation of the fuel cell stack 100. The controller 20 also starts rotating the air compressor 32 and the cooling water pump 73 for power generation of the fuel cell stack 100.

Figure 3:
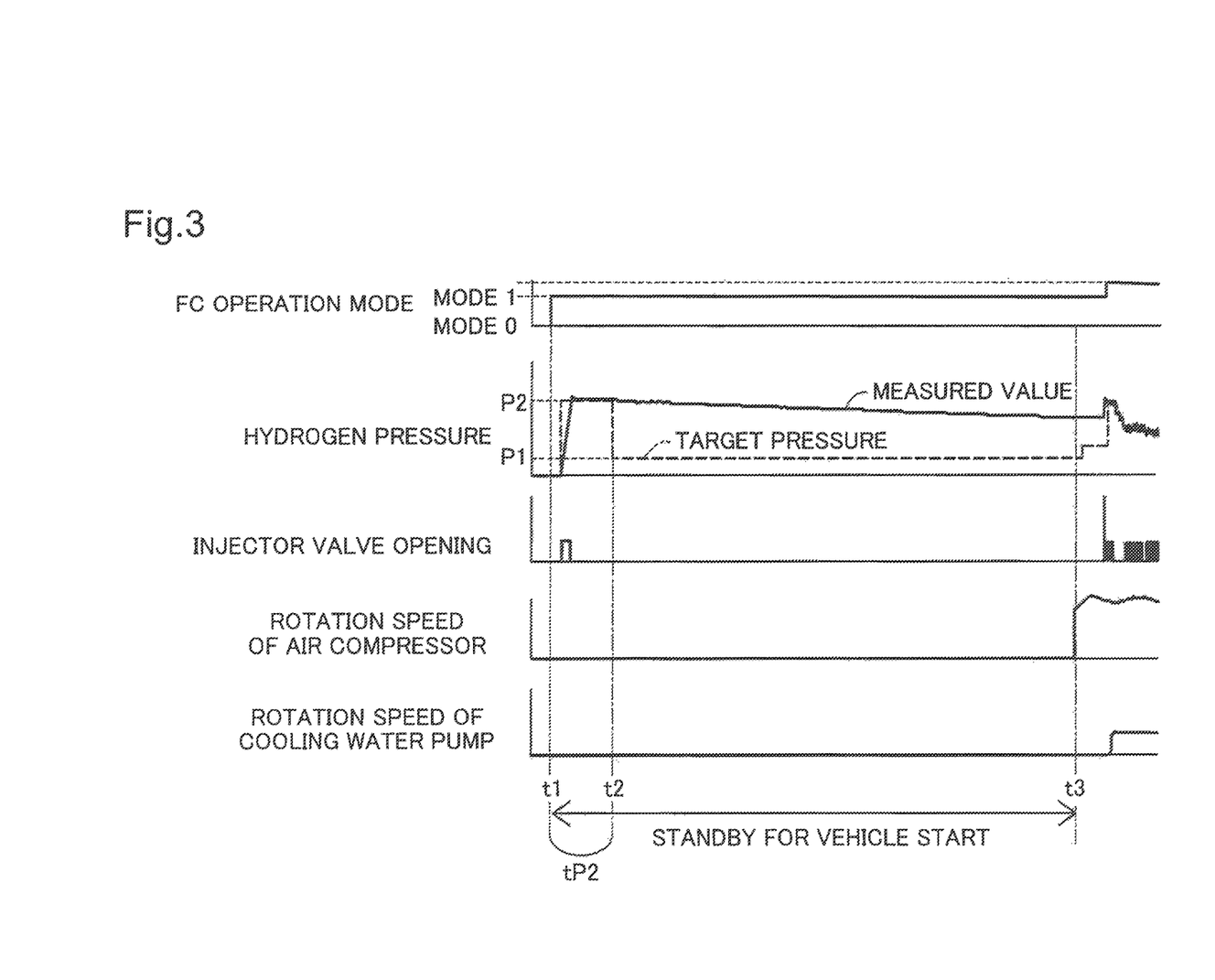
FIG. 3 is a diagram illustrating one example of the state of the fuel cell system in the hydrogen supply process.

FIG. 3 is a diagram illustrating one example of the state of the fuel cell system 10 in the hydrogen supply process. FIG. 3 shows variations in the operation mode of the fuel cell system 10, the hydrogen pressure as the anode pressure, the valve open-close state of the injector 55, the rotation speed of the air compressor 32 and the rotation speed of the cooling water pump 73 with time as abscissa. With regard to the hydrogen pressure in FIG. 3, a broken line curve shows a variation of the target pressure, and a solid line curve shows a variation of the measured value of pressure.

As shown in FIG. 3, on completion of start-up of a high voltage system such as a battery connected with the fuel cell system 10 (at time t1), the operation mode of the fuel cell system 10 is changed from mode 0 indicating a stop mode to mode 1 indicating a start mode. The fuel cell stack 100 is in the non-power generation state, so that neither the air compressor 32 nor the cooling water pump 73 is rotated.

At time t1, the controller 20 sets the second target pressure P2 to the target pressure of the anode (step S100 in FIG. 2) and operates the injector 55 to make the anode pressure reach the second target pressure P2 (step S102 in FIG. 2). The measured value of hydrogen pressure then reaches the second target pressure P2.

As shown in FIG. 3, after elapse of the set time tP2 (at time t2, step S104: YES in FIG. 2), the first target pressure P1 is set to the target pressure of the anode (step S108 in FIG. 2). In the illustrated example of FIG. 3, the measured value of hydrogen pressure does not become lower than the first target pressure P1 until the standby state for starting the vehicle is not released. The injector 55 is accordingly operated only once to make the hydrogen pressure reach the second target pressure P2 during the standby state for starting the vehicle.

When the standby state for starting the vehicle is released (at time t3), the air compressor 32 and the cooling water pump 73 start rotating, and the injector 55 is operated to supply hydrogen required for power generation.

A3. Advantageous Effects

In general, in the non-power generation state of the fuel cell system 10, neither the air compressor 32 nor the cooling water pump 73 is rotated. Operation of the injector 55, especially frequent operation of the injector 55, in the non-power generation state is thus likely to make, for example, the user of the vehicle with the fuel cell system 10 mounted thereon feel uncomfortable because of the lack of operation noise of the air compressor 32 and the cooling water pump 73, compared with operation of the injector 55 in the power generation state. As described above, however, the fuel cell system 10 of the embodiment sets the second target pressure P2 that is higher than the first target pressure P1 to the target pressure of the anode in the non-power generation state of the fuel cell stack 100 and controls the operation of the injector 55 to make the anode pressure equal to the second target pressure P2. After the anode pressure is increased to be higher than the first target pressure P1, the fuel cell system 10 sets the first target pressure P1 to the target pressure of the anode and controls the operation of the injector 55 to make the anode pressure equal to the first target pressure P1. This reduces the frequency when the anode pressure becomes lower than the first target pressure P1. This results in reducing the number of times of operation of the injector 55 for the purpose of making the anode pressure equal to the target pressure. This accordingly reduces at least one of the noise and the vibration caused by the operation of the injector 55.

Additionally, the first target pressure P1 is the minimum required pressure to supply hydrogen over the entire anodes in the fuel cell stack 100. This suppresses deterioration of the fuel cell stack 100 caused by partial deficiency of hydrogen in the anodes.

The fuel cell system 10 of the embodiment supplies hydrogen to the anodes in the nonpower generation state of the fuel cell stack 100. This saves the time period until hydrogen is actually supplied to the fuel cell stack 100 at the time of power generation of the fuel cell stack 100. This accordingly shortens the time required for starting power generation of the fuel cell stack 10.

B. Second Embodiment

B1. System Configuration

The fuel cell system 10 of the first embodiment suppresses deterioration of the fuel cell stack 100 caused by deficiency of hydrogen in the anodes, while reducing the noise and the vibration caused by the operation of the injector 55 in the non-power generation state that is after a start of the fuel cell system 10 but is before power generation of the fuel cell stack 100. A second embodiment, on the other hand, describes a fuel cell system 10a that includes an anode gas circulation system 80 configured to circulate an anode off-gas discharged from the anodes to the fuel cell stack 100 and thereby more effectively suppresses deterioration of the fuel cell stack 100 caused by deficiency of hydrogen in the anodes.

Figure 4:
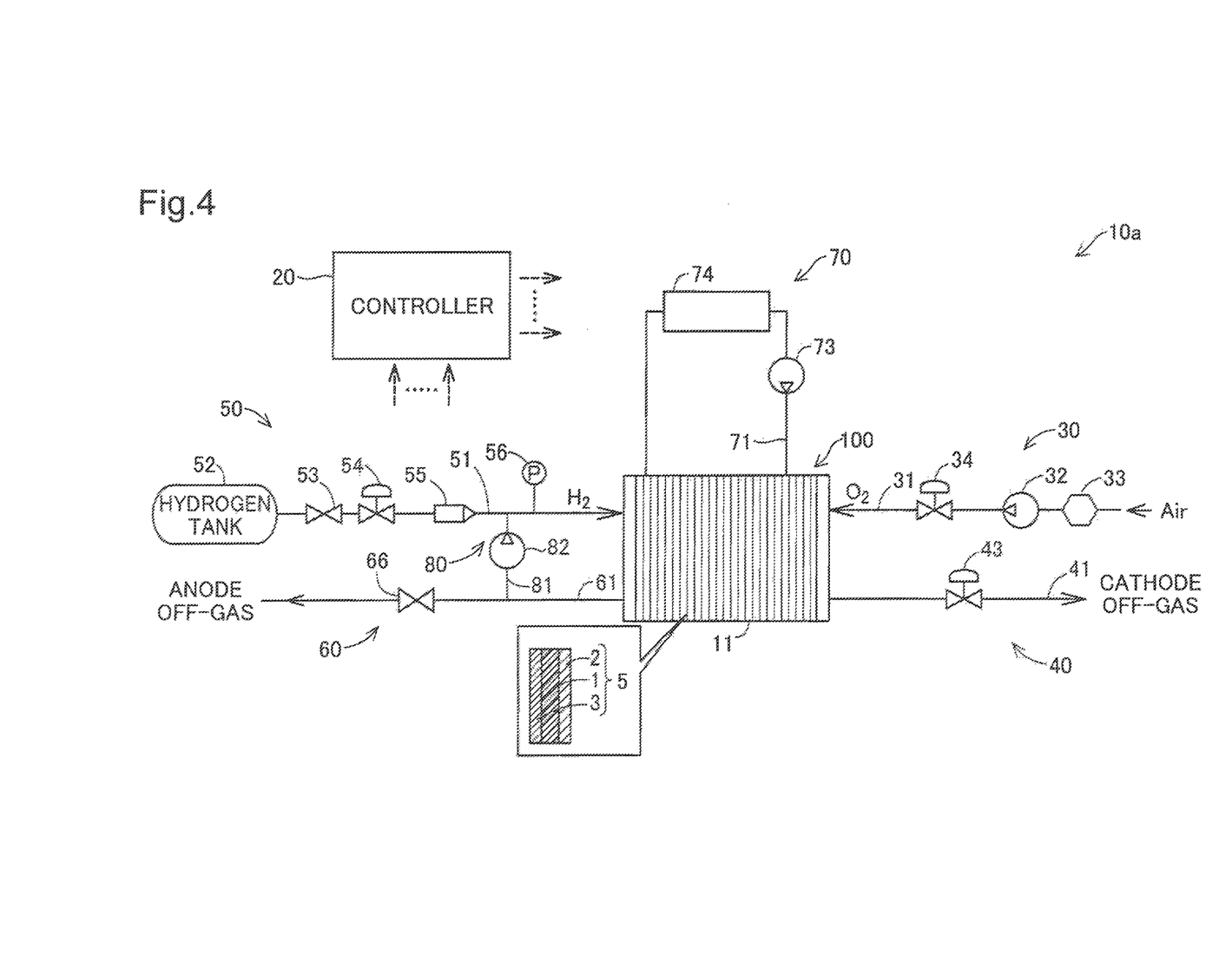
FIG. 4 is a diagram illustrating the schematic configuration of a fuel cell system according to a second embodiment.

FIG. 4 is a diagram illustrating the schematic configuration of the fuel cell system 10a according to the second embodiment. The fuel cell system 10a of this embodiment includes the fuel cell stack 100, the controller 20, the cathode gas supply system 30, the cathode gas discharge system 40, the anode gas supply system 50, the anode gas discharge system 60, the cooling system 70 and the anode gas circulation system 80.

The anode as circulation system 80 mainly includes an anode gas circulation pipe 81 and a hydrogen pump 82 that is provided on the anode gas circulation pipe 81. The controller 20 controls the anode gas circulation system 80 to operate the hydrogen pump 82 and circulate an anode off-gas via the anode gas circulation pipe 81 to the anodes of the fuel cell stack 100. The anode off-gas is a gas that includes hydrogen and nitrogen as unreacted gases that are not consumed by the power generation reaction at the anodes of the fuel cell stack 100 and is discharged from the anodes. The controller 20 also operates the hydrogen pump 82 to return the anode off-gas discharged from the anodes to the anodes in the nonpower generation state. The anode gas circulation pipe 81 is also called "circulation passage". The fuel cell system 10a of the second embodiment has the configuration similar to the configuration of the fuel cell system 10 of the first embodiment, except the configuration of the anode gas circulation system 80. The other configuration of the fuel cell system 10a of the second embodiment is thus not specifically described.

B2. Hydrogen Supply Process

Figure 5:
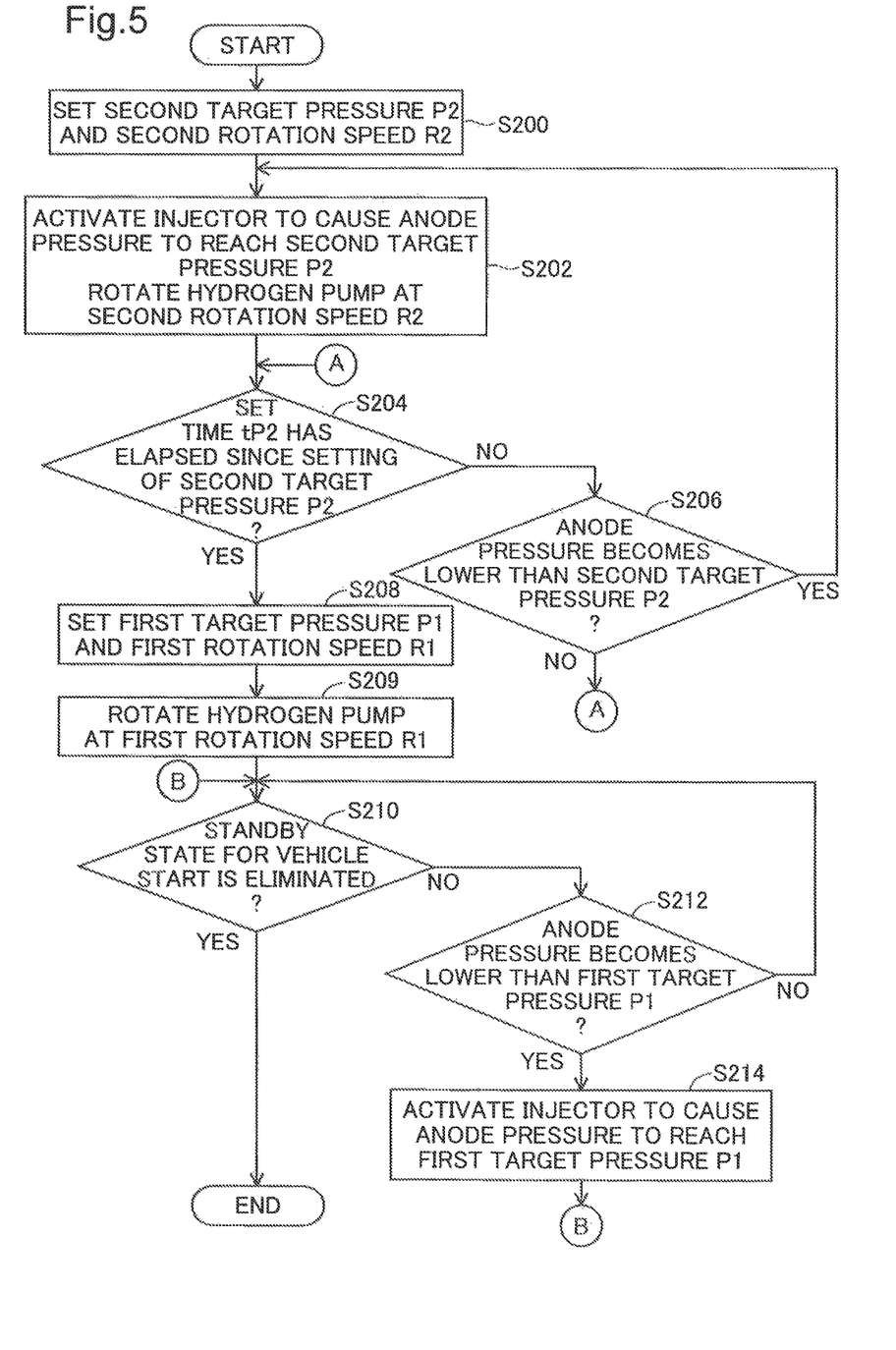
FIG. 5 is a flowchart showing a hydrogen supply process performed by the controller according to the second embodiment.

FIG. 5 is a flowchart showing a hydrogen supply process performed by the controller 20 according to the second embodiment. According to the first embodiment described above, the controller 20 sets the second target pressure P2 to the target pressure of the anode (step S100 in FIG. 2) and operates the injector 55 to make the anode pressure reach the second target pressure P2 (step S102 in FIG. 2). According to the second embodiment, on the other hand, the controller 20 sets the second target pressure P2 and a second rotation speed R2 (step S200 in FIG. 5) and subsequently rotates the hydrogen pump 82 at the second rotation speed R2, along with operating the injector 55 to make the anode pressure reach the second target pressure P2 (step S202 in FIG. 5). Additionally, according to the first embodiment described above, after elapse of the set time tP2, the controller 20 sets the first target pressure P1 to the target pressure of the anode (step S108 in FIG. 2). According to the second embodiment, on the other hand, after elapse of the set time tP2, the controller 20 sets the first target pressure P1 and a first rotation speed R1 (step S208 in FIG. 5) and rotates the hydrogen pump 82 at the first rotation speed R1 (step S209 in FIG. 5). The other part of the hydrogen supply process in the second embodiment is similar to that in the first embodiment and is not specifically described.

According to this embodiment, the second rotation speed R2 is a sufficient rotation speed to eliminate the state where the air is present in the anodes of the fuel cell stack 100, if applicable, at a start of the hydrogen supply process and to supply hydrogen over the entire anodes. The first rotation speed R1 is a minimum required rotation speed of the hydrogen pump 82. The controller 20 may start rotating the hydrogen pump 82 at the first rotation speed R1 at a start of the hydrogen supply process.

Figure 6:
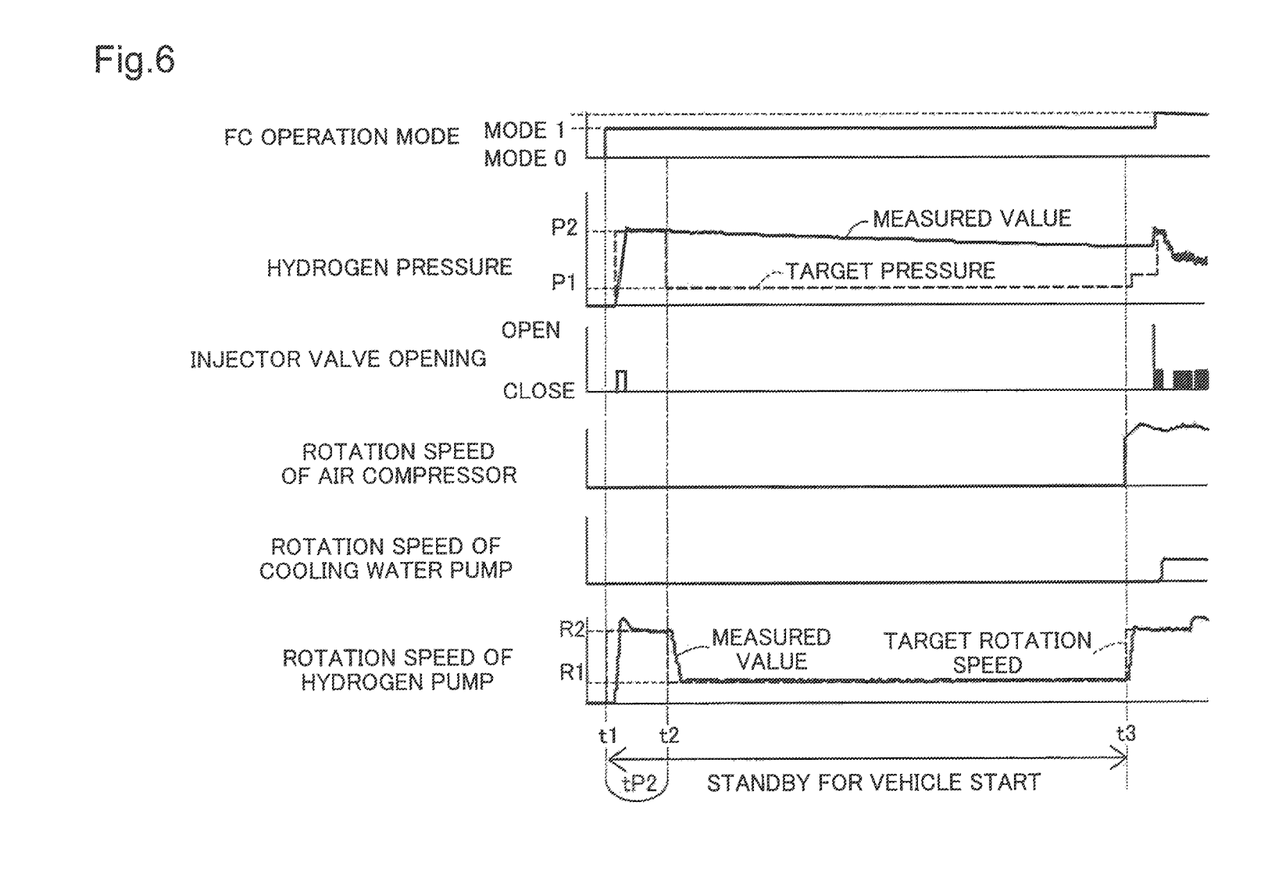
FIG. 6 is a diagram illustrating one example of the state of the fuel cell system in the hydrogen supply process according to the second embodiment.

FIG. 6 is a diagram illustrating one example of the state of the fuel cell system 10a in the hydrogen supply process of the second embodiment. FIG. 6 shows variations in the operation mode of the fuel cell system 10a, the hydrogen pressure, the valve open-close state of the injector 55, the rotation speed of the air compressor 32, the rotation speed of the cooling water pump 73 and the rotation speed of the hydrogen pump 82 with time as abscissa. With regard to the rotation speed of the hydrogen pump 82 shown in FIG. 6, a broken line curve shows a variation of the target rotation speed, and a solid line curve shows a variation of the measured value of rotation speed. According to this embodiment, at time ti, the controller 20 sets the second target pressure P2 to the target pressure of the anode (step S200 in FIG. 5) and operates the injector 55 to make the anode pressure reach the second target pressure P2 (step S202 in FIG. 5). The measured value of hydrogen pressure then reaches the second target pressure. At the same time, the controller 20 rotates the hydrogen pump 82 at the second rotation speed R2 (step S202 in FIG. 5).

As shown in FIG. 6, after elapse of the set time tP2 (at time t2, step S204: YES in FIG. 5), the controller 20 sets the first target pressure P1 to the target pressure of the anode and sets the first rotation speed R1 to the rotation speed of the hydrogen pump 82 (step S208 in FIG. 5) and rotates the hydrogen pump 82 at the first rotation speed R1 (step S209 in FIG. 5). In the illustrated example of FIG. 6, the measured value of hydrogen pressure does not become lower than the first target pressure P1 until the standby state for starting the vehicle is released. In the illustrated example of FIG. 6, the injector 55 is accordingly operated only once during the standby state for starting the vehicle. The hydrogen pump 82 is rotated at the second rotation speed R2 and is subsequently rotated at the first rotation speed R1 that is the minimum required rotation speed of the hydrogen pump 82. When the standby state for starting the vehicle is released (at time t3), the air compressor 32 and the cooling water pump 73 start rotating, and the injector 55 is operated to supply a pressure required for power generation.

B3. Advantageous Effects

As described above, in the non-power generation state of the fuel cell, the fuel cell system 10a of this embodiment sets second target pressure P2 to the target pressure of the anode and subsequently sets the first target pressure P1 that is lower than the second target pressure P2 to the target pressure of the anode. The first target pressure P1 is the minimum required pressure to supply hydrogen over the entire anodes. The fuel cell system 10a accordingly has the similar advantageous effects to those of the first embodiment.

Additionally, in the fuel cell system 10a of this embodiment, the controller 20 rotates the hydrogen pump 82 to make it easier to supply hydrogen over the entire anodes. This more effectively suppresses deterioration of the fuel cell stack 100 caused by partial deficiency of hydrogen in the anodes. Furthermore, the first rotation speed R1 is the minimum required rotation speed to suppress partial deficiency of hydrogen in the anodes. This accordingly reduces the noise and the vibration caused by the operation of the hydrogen pump 82 even when the hydrogen pump 82 is operated in the non-power generation state.

The fuel cell system 10a of this embodiment rotates the hydrogen pump 82 at the second rotation speed R2 that is higher than the first rotation speed R1, simultaneously with setting the second target pressure P2 to the target pressure of the anode. Even when the air is present in the anodes of the fuel cell stack 100 at the start of the fuel cell system 10a, this enables hydrogen to be supplied over the entire anodes more quickly and thus effectively suppresses partial deficiency of hydrogen in the anodes.

C. Third Embodiment

C1. System Configuration

The fuel cell systems 10 and 10a of the first and the second embodiments reduce the noise and the vibration caused by the operation of the injector 55, while supplying hydrogen to the fuel cell stack 100 in the non-power generation state, in order to save the time period until hydrogen is actually supplied to the fuel cell stack 100 at the start of power generation of the fuel cells 11. A third embodiment, on the other hand, describes a fuel cell system that is configured to suppress the noise and the vibration caused by the operation of the injector 55 while supplying hydrogen to the fuel cell stack 100 to perform a hydrogen leakage test in the non-power generation state of the fuel cell stack 100. In the non-power generation state, after making the anode pressure equal to the second target pressure P2, the controller 20 measures the anode pressure to perform the hydrogen leakage test. The schematic configuration of the fuel cell system of the third embodiment is similar to that of the first embodiment and is thus not specifically described.

C2. Hydrogen Supply Process

Figure 7:
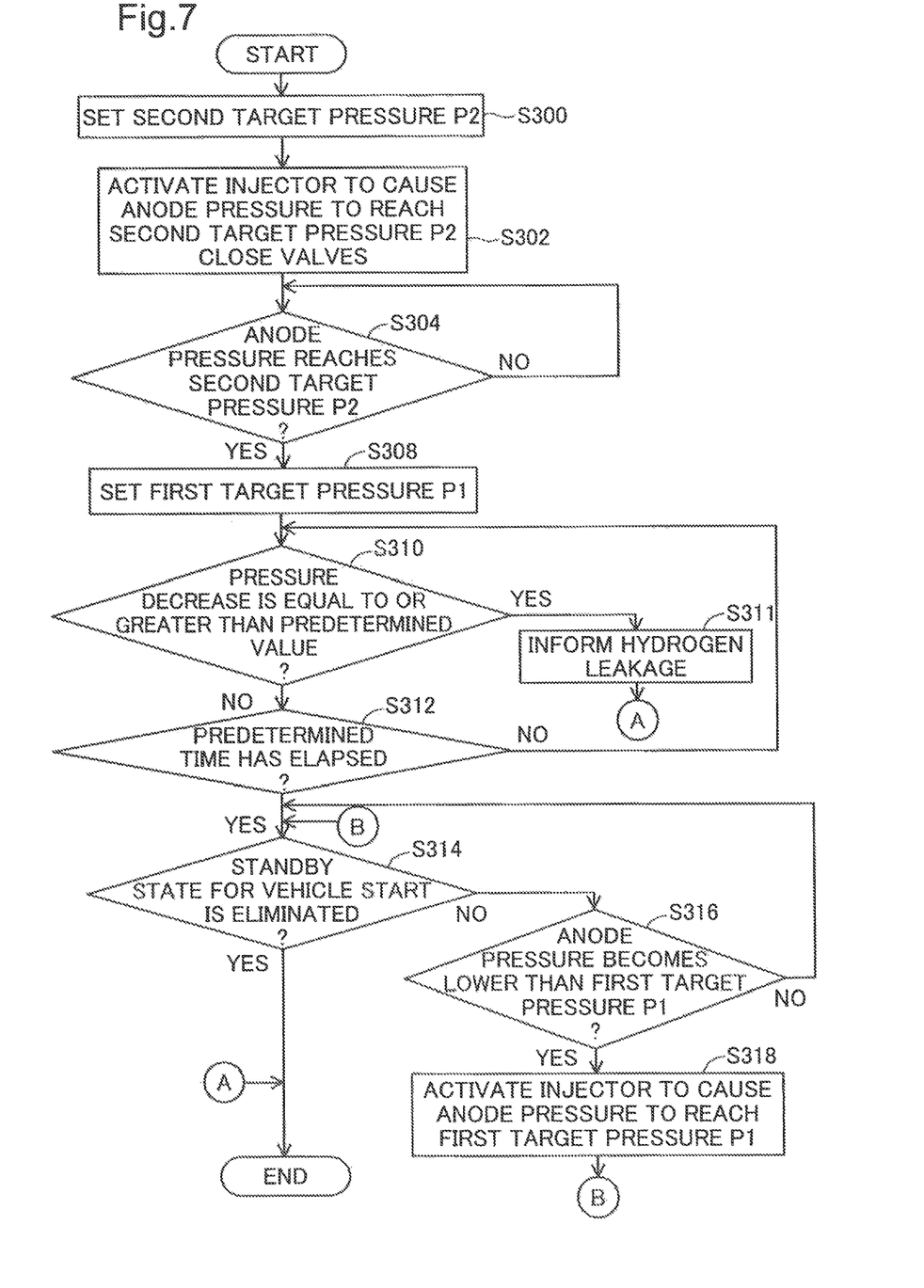
FIG. 7 is a flowchart showing a hydrogen supply process according to a third embodiment.

FIG. 7 is a flowchart showing a hydrogen supply process according to the third embodiment. The hydrogen supply process of this embodiment is performed simultaneously with the hydrogen leakage test.

On start of the hydrogen supply process, the controller 20 sets the second target pressure P2 to the target pressure of the anode (step S300) and operates the injector 55 to make the anode pressure reach the second target pressure P2 and then closes the on-off valves 53 and 66. When the anode pressure reaches the second target pressure P2 (step S304: YES), the controller 20 sets the first target pressure P1 to the target pressure of the anode (step S308). When the anode pressure does not reach the second target pressure P2 (step S304: NO), on the other hand, the controller 20 waits until the anode pressure reaches the second target pressure P2.

The controller 20 subsequently determines whether a decrease of the anode pressure is equal to or greater than a predetermined value (step S310). More specifically, the controller 20 obtains the anode pressure measured by the pressure measurement unit 56 and determines whether the decrease of the anode pressure is equal to or greater than the sum of an amount of decrease of hydrogen by crossover and a measurement error of the pressure measurement unit 56. When the decrease of the anode pressure is equal to or greater than the predetermined value (step S310: YES), the controller 20 informs the user of a hydrogen leakage by, for example, turning on an alarm lamp (step S311) and terminates the hydrogen supply process.

When the decrease of the anode pressure is less than the predetermined value (step S310: NO), on the other hand, the controller 20 determines whether a predetermined time has elapsed (step S312). The predetermined time is a time period determined in advance to perform the hydrogen leakage test and may start counting, for example, after the anode pressure reaches the second target pressure P2. When the predetermined time has not yet elapsed (step S312: NO), the controller 20 returns to step S310 to determine again whether the decrease of the anode pressure is equal to or greater than the predetermined value.

After the predetermined time has elapsed (step S312: YES), the controller 20 opens the on-off valves 53 and 66 and performs a series of processing that is equivalent to the processing of steps S110 to S114 in the first embodiment (steps S314 to S318). More specifically, the controller 20 determines whether the standby state for starting the vehicle is released (step S314). When the standby state is not released (step S314: NO), the controller 20 determines whether the anode pressure becomes lower than the first target pressure P1 (step S316). When the anode pressure becomes lower than the first target pressure P1 (step S316: YES), the controller 20 operates the injector 55 to make the anode pressure reach the first target pressure P1 (step S318). When the standby state for starting the vehicle is released (step S311: YES), on the other hand, the controller 20 terminates the hydrogen supply process.

C3. Advantageous Effects

As described above, the fuel cell system of this embodiment sets the second target pressure P2 to the target pressure of the anode and subsequently sets the first target pressure P1 that is lower than the second target pressure P2 to the target pressure of the anode in the hydrogen leakage test performed simultaneously with the hydrogen supply process. The first target pressure P1 is the minimum required pressure to supply hydrogen over the entire anodes. The fuel cell system of this embodiment accordingly has the similar advantageous effects to those of the first embodiment described above in the configuration that performs the hydrogen leakage test simultaneously with the hydrogen supply process.

D. Modifications

D1. Modification 1

In the respective embodiments described above, when the anode pressure becomes lower than the first target pressure P1 (step S112: YES in FIG. 2, step S212: YES in FIG. 5 or step S316: YES in FIG. 7), the controller 20 operates the injector 55 to make the anode pressure reach the first target pressure P1 (step S114 in FIG. 2, step S214 in FIG. 5 or step S318 in FIG. 7). According to a modification, when the anode pressure becomes lower than the first target pressure P1, the controller 20 may operate the injector 55 to make the anode pressure reach a pressure higher than the first target pressure P1, for example, reach the second target pressure P2. Compared with the configuration that operates the injector 55 to make the anode pressure reach the first target pressure P1, this modified configuration increases the anode pressure and thereby extends a time period until the anode pressure becomes lower than the first target pressure P1. This further decreases the frequency of operation of the injector 55 in the hydrogen supply process and thereby further reduces the noise and the vibration in the fuel cell system 10 or 10a.

D2. Modification 2

In the first embodiment and the second embodiment described above when the anode pressure becomes lower than the second target pressure P2 (step S106: YES in FIG. 2 or step S206: YES in FIG. 5), the controller 20 operates the injector 55 to make the anode pressure reach the second target pressure P2 (step S102 in FIG. 2 or step S202 in FIG. 5). According to a modification, when the anode pressure becomes lower than the second target pressure P2 by a predetermined percentage, the controller 20 may operate the injector 55 to make the anode pressure reach the second target pressure P2. For example, when the anode pressure becomes lower than the second target pressure P2 by 10%, the controller 20 may operate the injector 55 to make the anode pressure reach the second target pressure P2.

D3. Modification 3

In the first embodiment and the second embodiment described above, the controller 20 operates the injector 55 to make the anode pressure reach the second target pressure P2 (step S102 in FIG. 2 or step S202 in FIG. 5). The anode pressure may not be necessarily controlled to reach the second target pressure P2 but should be controlled to be higher than the first target pressure P1, in order to decrease the frequency of operation of the injector 55.

D4. Modification 4

In the first embodiment described above, the controller 20 determines whether the set time tP2 has elapsed (step S104 in FIG. 2). When the set time tP2 has not yet elapsed (step S104: NO in FIG. 2), the controller 20 determines whether the anode pressure becomes lower than the second target pressure P2 (step S106 in FIG. 2). A modification may omit the processing of steps S104 and S106.

D5. Modification 5

In the second embodiment described above, the controller 20 determines whether the set time tP2 has elapsed (step S204 in FIG. 5). When the set time tP2 has not yet elapsed (step S204: NO in FIG. 5), the controller 20 determines whether the anode pressure becomes lower than the second target pressure P2 (step S206 in FIG. 5). A modification may omit the processing of steps S204 and S206.

D6. Modification 6

In the respective embodiments described above, the controller 20 obtains the pressure on the downstream side of the injector 55 as the anode pressure in the fuel cell stack 100. According to a modification, the fuel cell stack 100 may be provided with a pressure sensor, and the controller 20 may obtain the pressure measured by the sensor as the anode pressure in the fuel cell stack 100. According to another modification, a pressure sensor may be provided in the fuel cell 11 that is placed most distant from the anode gas pipe 51, and the controller 20 may obtain the pressure measured by the sensor as the anode pressure in the fuel cell stack 100. According to another modification, a current sensor may be provided to measure the current value of the fuel cell 11, and the controller 20 may obtain the current value of the fuel cell 11 and calculate the anode pressure from the obtained current value based on a relationship between the current value and the anode pressure experimentally determined in advance.

D7. Modification 7

In the respective embodiments described above, the controller 20 supplies the anode gas based on the obtained anode pressure. According to a modification, the fuel cell system 10 or 10a may be provided with sensor that is configured to measure a hydrogen partial pressure or a hydrogen concentration in the anode gas, and the controller 20 may obtain the hydrogen partial pressure or the hydrogen concentration in the anode gas. The controller 20 may supply the anode gas, based on the obtained hydrogen partial pressure or hydrogen concentration.

D8. Modification 8

In the respective embodiments described above, the first target pressure P1 and the second target pressure P2 are stored in the ROM of the controller 20. According to a modification, the controller 20 may store a calculation formula or a map that specifies a relationship between the obtained anode pressure and the pressure required to prevent hydrogen deficiency in the anodes in the ROM and may set the target pressure based on the calculation formula or map.

D9. Modification 9

In the third embodiment described above, the fuel cell system includes the fuel cell stack 100, the controller 20, the cathode gas supply system 30, the cathode gas discharge system 40, the anode gas supply system 50, the anode gas discharge system 60 and the cooling system 70, like the first embodiment. According to a modification, the fuel cell system of the third embodiment may additionally include the anode gas circulation system 80 configured to circulate the anode off-gas to the fuel cell stack 100, like the second embodiment. Additionally, the fuel cell system of the third embodiment may set the first target pressure P1 and the first rotation speed R1 and may rotate the hydrogen pump at the first rotation speed R1, like the second embodiment. The fuel cell system of the third embodiment may also set the second target pressure P2 and the second rotation speed R2 and may operate the injector to make the anode pressure reach the second target pressure P2 while rotating the hydrogen pump at the second rotation speed R2. This modification of the third embodiment has the similar advantageous effects to those of the second embodiment in the configuration that performs the hydrogen leakage test.

The invention claimed is:

1. A fuel cell system, comprising:
a fuel cell stack that has a plurality of fuel cells, wherein each fuel cell includes an electrolyte membrane, an anode formed on one surface of the electrolyte membrane and a cathode formed on the other surface of the electrolyte membrane;
an injector that is configured to supply hydrogen to the anode;
a cathode gas supply system that is configured to supply cathode gas to the cathode; and
a controller programmed to control the injector and the cathode gas supply system, wherein
in a non-power generation state that is after a start of the fuel cell system but is before power generation of the fuel cells, the controller is programmed to set a second target pressure that is higher than a first target pressure to a target pressure of the anode and to control operation of the injector to make the pressure of the anode equal to the second target pressure, and
after the pressure of the anode is increased to be higher than the first target pressure, and after elapse of a previously set time since setting of the second target pressure to the target pressure of the anode, the controller is programmed to set the first target pressure to the target pressure of the anode and to control operation of the injector to make the pressure of the anode equal to the first target pressure, wherein
the first target pressure is a pressure required to supply hydrogen over the entire anode in the fuel cell stack, and
the previously set time is a time period required for starting supply of cathode gas to the cathode.

2. The fuel cell system according to claim 1, further comprising
a circulation passage that is arranged to return an off gas discharged from the anode, to the anode; and
a pump that is provided on the circulation passage, wherein
the controller operates the pump to return the off gas discharged from the anode, to the anode in the non-power generation state.

3. The fuel cell system according to claim 1,
wherein in the non-power generation state, after making the pressure of the anode equal to the second target pressure, the controller measures the pressure of the anode to perform a hydrogen leakage test.

4. A method of using a fuel cell system, wherein the fuel cell system comprises a fuel cell stack that has a plurality of fuel cells, each fuel cell including an electrolyte membrane, an anode formed on one surface of the electrolyte membrane and a cathode formed on the other surface of the electrolyte membrane, wherein the fuel cell system further comprises an injector that is configured to supply hydrogen to the anode, a cathode gas supply system that is configured to supply cathode gas to the cathode, and a controller programmed to control the injector and the cathode gas supply system, the method comprising:
controlling, via the controller, the injector and the cathode gas supply system, wherein the controlling comprises
in a non-power generation state that is after a start of the fuel cell system but is before power generation of the fuel cells, the controller sets a second target pressure that is higher than a first target pressure to a target pressure of the anode, and the controller controls operation of the injector to make the pressure of the anode equal to the second target pressure; and
after the pressure of the anode is increased to be higher than the first target pressure, and after elapse of a previously set time since setting of the second target pressure to the target pressure of the anode, the controller sets the first target pressure to the target pressure of the anode, and the controller controls operation of the injector to make the pressure of the anode equal to the first target pressure, wherein
the first target pressure is a pressure required to supply hydrogen over the entire anode in the fuel cell stack, and
the previously set time is a time period required for starting supply of cathode gas from a cathode gas supply system to the cathode.

5. The method of claim 4, further comprising:
in the non-power generation state, the controller operates a pump to return to the anode an off gas discharged from the anode.

6. The method of claim 4, further comprising:
in the non-power generation state, after making the pressure of the anode equal to the second target pressure, the controller measures the pressure of the anode to perform a hydrogen leakage test.

* * * * *